US010795824B2

(12) United States Patent
Berger et al.

(10) Patent No.: US 10,795,824 B2
(45) Date of Patent: Oct. 6, 2020

(54) SPECULATIVE DATA RETURN CONCURRENT TO AN EXCLUSIVE INVALIDATE REQUEST (71) Applicant: INTERNATIONAL BUSINESS MACHINES CORPORATION, Armonk, NY (US)

(72) Inventors: Deanna P. Berger, Hyde Park, NY (US); Christian Jacobi, West Park, NY (US); Robert J. Sonnelitter, III, Mount Vernon, NY (US); Craig R. Walters, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 35 days.

(21) Appl. No.: 16/197,669

(22) Filed: Nov. 21, 2018

(65) Prior Publication Data
US 2020/0159665 A1 May 21, 2020

(51) Int. Cl.
G06F 12/0891 (2016.01)
G06F 12/084 (2016.01)
(52) U.S. Cl.
CPC ........ G06F 12/0891 (2013.01); G06F 12/084 (2013.01); G06F 2212/1032 (2013.01)
(58) Field of Classification Search
CPC .................................................. G06F 12/0891
See application file for complete search history.

(56) References Cited

U.S. PATENT DOCUMENTS

| 5,222,224 | A | 6/1993 | Flynn et al. |
| 6,823,429 | B1 | 11/2004 | Olnowich |
| 6,938,128 | B1 | 8/2005 | Kuskin et al. |
| 7,376,794 | B2 | 5/2008 | Steely, Jr. et al. |
| 7,962,696 | B2 | 6/2011 | Steely, Jr. et al. |
| 8,635,410 | B1 * | 1/2014 | Kuskin ............... G06F 12/0891 711/141 |
| 9,563,467 | B1 | 2/2017 | Gschwind et al. |
| 9,916,180 | B2 | 3/2018 | Gschwind et al. |
| 2005/0154805 | A1 * | 7/2005 | Steely, Jr. ........... G06F 9/30043 710/52 |
| 2005/0154831 | A1 * | 7/2005 | Steely, Jr. ........... G06F 12/0811 711/130 |

(Continued)

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

(Continued)

Primary Examiner — Sean D Rossiter
(74) Attorney, Agent, or Firm — William A. Kinnaman, Jr., Esq.; Blanche E. Schiller, Esq.; Heslin Rothenberg Farley & Mesiti P.C.

(57) ABSTRACT

Speculative data return in parallel with an exclusive invalidate request. A requesting processor requests data from a shared cache. The data is owned by another processor. Based on the request, an invalidate request is sent to the other processor requesting the other processor to release ownership of the data. Concurrent to the invalidate request being sent to the other processor, the data is speculatively provided to the requesting processor.

20 Claims, 9 Drawing Sheets

(56) References Cited

U.S. PATENT DOCUMENTS

| | | | |
|---|---|---|---|
| 2008/0177905 A1* | 7/2008 | Ohta | G06F 9/45533 |
| | | | 710/14 |
| 2008/0235474 A1* | 9/2008 | Hwang | G06F 12/0815 |
| | | | 711/163 |
| 2014/0258635 A1* | 9/2014 | Hong | G06F 12/0808 |
| | | | 711/133 |
| 2016/0217076 A1 | 7/2016 | Berger | |
| 2016/0350352 A1* | 12/2016 | Hase | G06F 16/2343 |
| 2018/0052788 A1* | 2/2018 | Guthrie | G06F 9/3834 |
| 2019/0332325 A1* | 10/2019 | Dong | G06F 3/0689 |
| 2019/0394297 A1* | 12/2019 | Pitts | H04L 67/1097 |

OTHER PUBLICATIONS

IBM, "z/Architecture—Principles of Operation," IBM Publication No. SA22-7832-11, Twelfth Edition, Sep. 2017, pp. 1-1902.

Shi, Z. Jerry, "Multiprocessors: Basics, Cache Coherence, Synchronization, and Memory Consistency," University of Connecticut, 2012 (no further date information available).

Horowitz, Mark, "Polymorphous Computer Architectures," Dec. 2007, pp. 1-85 (+ cover pages).

IBM, "Method to Handle Speculative Load Requests in a Cache Environment," IP.com No. IPCOM00018823D, Sep. 28, 2009, p. 1 (+ cover page).

Anonymous, "Simultaneous Data Prefetch Request Probing and Recycled Data Forwarding from a Load Store Unit," IP.com No. IPCOM000221102D, Aug. 29, 2012, pp. 1-6 (+ cover page).

Anonymous, "A Novel Data Prefetch Method Under Heterogeneous Architecture," IP.com No. IPCOM000224167D, Dec. 12, 2012, pp. 1-13 (+ cover page).

Anonymous, "Trace-Core Processors," IP.com No. IPCOM000199882D, Sep. 20, 2010, pp. 1-16 (+ cover page).

* cited by examiner

REQUEST, BY A REQUESTING PROCESSOR OF THE COMPUTING ENVIRONMENT, DATA OF A SHARED CACHE —— 400

THE DATA IS OWNED BY ANOTHER PROCESSOR OF THE COMPUTING ENVIRONMENT —— 402

OBTAIN THE DATA BY THE REQUESTING PROCESSOR CONCURRENT TO AN INVALIDATE REQUEST BEING SENT TO THE OTHER PROCESSOR REQUESTING THE OTHER PROCESSOR TO RELEASE OWNERSHIP OF THE DATA BEING REQUESTED —— 404

THE REQUEST INCLUDES SENDING AN EXCLUSIVE OR A CONDITIONAL EXCLUSIVE FETCH REQUEST TO THE SHARED CACHE REQUESTING THE DATA —— 406

THE OBTAINING THE DATA INCLUDES OBTAINING A SPECULATIVE INDICATOR WITH THE DATA INDICATING THAT THE DATA IS SPECULATIVE DATA —— 408

USE THE DATA IN ONE OR MORE OPERATIONS PRIOR TO RECEIVING A RESPONSE FROM THE INVALIDATE REQUEST —— 410

THE DATA OBTAINED BY THE REQUESTING PROCESSOR IS SPECULATIVE DATA —— 412

CHECK WHETHER A RESPONSE BASED ON THE INVALIDATE REQUEST HAS BEEN RECEIVED BY THE REQUESTING PROCESSOR —— 414

PERFORM PROCESSING DEPENDING ON WHETHER THE CHECKING INDICATES THAT THE RESPONSE BASED ON THE INVALIDATE REQUEST HAS BEEN RECEIVED BY THE REQUESTING PROCESSOR —— 416

FIG. 4A

THE PERFORMING PROCESSING INCLUDES DETERMINING, BASED ON THE CHECKING INDICATING THE RESPONSE BASED ON THE INVALIDATE REQUEST HAS BEEN RECEIVED BY THE REQUESTING PROCESSOR, WHETHER THE DATA OBTAINED BY THE REQUESTING PROCESSOR IS STALE ~420

BASED ON THE DETERMINING INDICATING THAT THE DATA IS VALID, PERFORM A COMMIT RELATED TO THE ONE OR MORE OPERATIONS USING THE DATA ~422

BASED ON THE DETERMINING INDICATING THAT THE DATA IS STALE, PERFORM A ROLLBACK OF THE ONE OR MORE OPERATIONS ~424

THE PERFORMING PROCESSING INCLUDES WAITING FOR THE RESPONSE BASED ON THE INVALIDATE REQUEST, BASED ON THE CHECKING INDICATING THAT THE RESPONSE BASED ON THE INVALIDATE REQUEST HAS NOT BEEN RECEIVED BY THE REQUESTING PROCESSOR ~426

SEND, BY THE SHARED CACHE, BASED ON RECEIVING A REQUEST FROM THE REQUESTING PROCESSOR REQUESTING THE DATA, AN INVALIDATE REQUEST TO THE OWNING PROCESSOR ~428

PROVIDE, CONCURRENT TO THE SENDING THE INVALIDATE REQUEST, THE DATA TO THE REQUESTING PROCESSOR ~430

SPECULATIVE DATA RETURN CONCURRENT TO AN EXCLUSIVE INVALIDATE REQUEST

BACKGROUND

One or more aspects relate, in general, to processing within a computing environment that includes multiple processors sharing one or more caches, and in particular, to facilitating such processing.

In computing environments that have multiple processors or cores sharing one or more caches, those processors may have access to the same cache lines. A cache line is a portion of data of a specific size (e.g., 256 bytes), which fits into a single cache entry. Coherency is managed on a cache line granularity as data is transferred between memory and a cache. To prevent corruption of the data being transferred, cross-core intervention (also referred to as invalidation) is used. Cross-core intervention includes receiving a request for a cache line, determining whether it is owned by a processor, and invalidating the requested cache line if it is owned by the processor prior to providing it to another processor. This protects the data and ensures the data remains coherent, but adds latency to cache accesses.

SUMMARY

Shortcomings of the prior art are overcome and additional advantages are provided through the provision of a computer program product for facilitating processing within a computing environment. The computer program product includes a computer readable storage medium readable by a processing circuit and storing instructions for performing a method. The method includes requesting, by a requesting processor of the computing environment, data of a shared cache. The data is owned by another processor of the computing environment. The data is obtained by the requesting processor concurrent to an invalidate request being sent to the other processor requesting the other processor to release ownership of the data being requested.

By concurrently sending the data and the invalidate request, cache latency is reduced and performance is improved.

In one example, the obtaining the data includes obtaining a speculative indicator with the data indicating that the data is speculative data. In one embodiment, the data is used in one or more operations prior to receiving a response from the invalidate request. This allows the data to be used prior to receiving an indication that the other processor has released its ownership; improving performance in situations where the data is not being updated by the other processor.

In one embodiment, a check is made as to whether a response based on the invalidate request has been received by the requesting processor. Processing is performed depending on whether the checking indicates that the response based on the invalidate request has been received by the requesting processor.

The performing processing includes, for instance, determining, based on the checking indicating the response based on the invalidate request has been received by the requesting processor, whether the data obtained by the requesting processor is stale. Based on the determining indicating that the data is valid, a commit related to the one or more operations using the data is performed. Based on the determining indicating that the data is stale, a rollback of the one or more operations is performed. Further, based on the checking indicating that the response based on the invalidate request has not been received by the requesting processor, the performing processing includes waiting for the response based on the invalidate request.

In one example, the data obtained by the requesting processor is speculative data.

Moreover, in one example, the requesting includes sending an exclusive or a conditional exclusive fetch request to the shared cache requesting the data.

In one embodiment, based on receiving a request from the requesting processor requesting the data, the shared cache sends an invalidate request to the owning processor, and concurrent to sending the invalidate request, provides the data to the requesting processor.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

One or more aspects relate to facilitating processing within a computing environment in order to reduce cache latency and improve system performance. In one aspect, a capability is provided to perform a speculative data return in parallel with an exclusive invalidate request in an environment in which multiple processors share one or more caches. Based on a request for data of a cache line owned by a particular processor, referred to herein as the owning processor, an invalidate request is sent to the owning processor simultaneous with providing data from the cache line to the requesting processor. The owning processor owns the cache line if, for instance, it has exclusive write access to the cache line. Further, simultaneous, concurrent or in parallel, as used herein, indicate that the data is provided to the requesting processor prior to, e.g., receiving a response from the invalidate request.

One embodiment of a computing environment to incorporate and use one or more aspects of the present invention is described with reference to FIGS. 1A-1C. In one example, the computing environment is based on the z/Architecture hardware architecture, offered by International Business Machines Corporation, Armonk, N.Y. One embodiment of the z/Architecture hardware architecture is described in "z/Architecture Principles of Operation," IBM Publication No. SA22-7832-11, Twelfth Edition, September 2017, which is hereby incorporated herein by reference in its entirety.

Figure 1A:
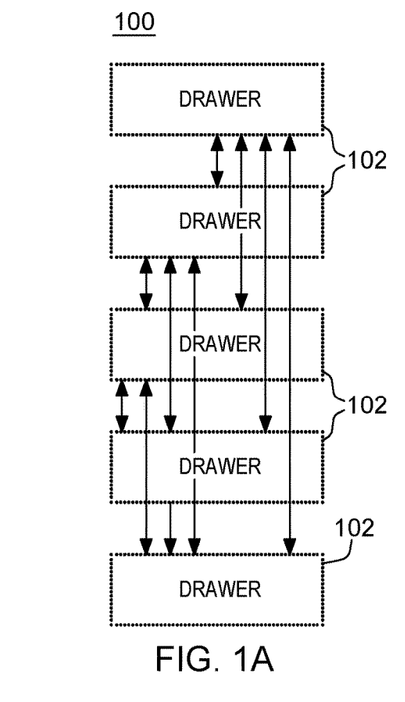
FIG. 1A depicts one example of a plurality of interconnected drawers of a computing environment to incorporate and use one or more aspects of the present invention.
Figure 1B:
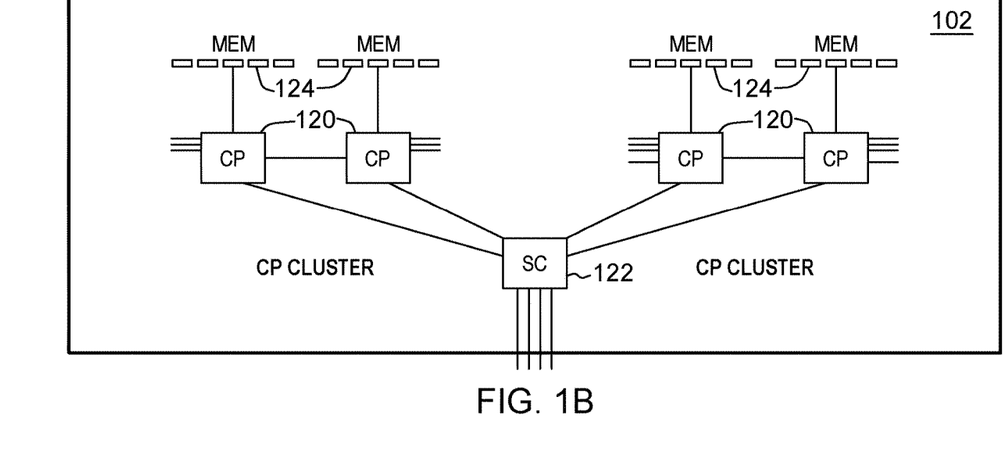
FIG. 1B depicts one example of further details of a drawer of the plurality of interconnected drawers of FIG. 1A, in accordance with one or more aspects of the present invention.
Figure 1C:
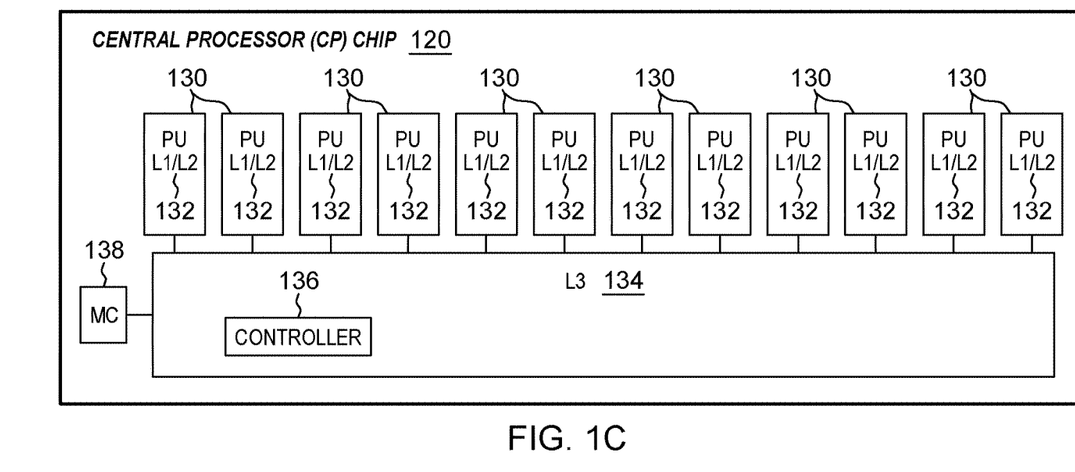
FIG. 1C depicts one example of further details of a central processor (CP) chip of the drawer of FIG. 1B, in accordance with one or more aspects of the present invention.

Referring to FIG. 1A, as an example, a computing environment 100 includes a plurality of interconnected drawers 102. A drawer 102, as depicted in FIG. 1B, includes a plurality of central processor chips 120 coupled to a system controller 122. System controller 122 is used to interconnect drawers of the plurality of drawers. Each central processor chip 120 is coupled to one or more memory modules 124. Further details relating to a central processor chip 120 are described with reference to FIG. 1C.

In one example, central processor chip 120 includes a plurality of processors 130 (also referred to herein as cores), each including one or more private caches 132, such as L1 and L2 caches. Processors 130 are coupled to a shared cache 134, such as a shared L3 cache. In one example, the shared L3 cache includes a controller 136 used in controlling access to the shared cache. Coupled to shared cache 134 is a memory controller 138 used to manage the flow of data between the shared cache and main memory.

Figure 2:
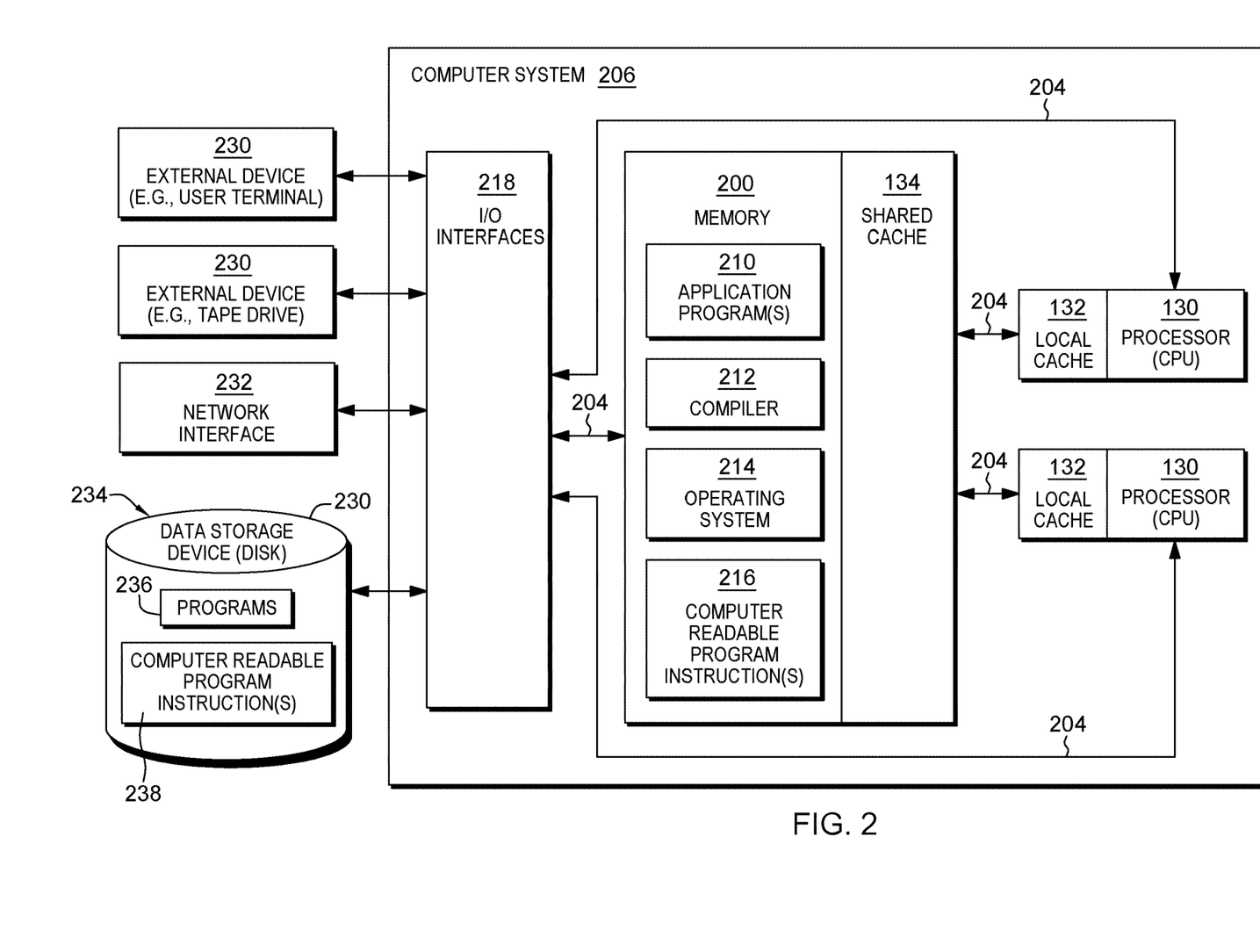
FIG. 2 depicts additional details of one example of the computing environment of FIG. 1A, in accordance with one or more aspects of the present invention.

In one example, as depicted in FIG. 2, shared cache 134 is coupled to memory 200 (a.k.a., system memory, main memory, main storage, central storage or storage, as examples). Further, memory 200 and processors 130 are coupled to one or more input/output (I/O) interfaces 218 via one or more buses and/or other connections 204. The processors, memory, shared and local caches, I/O interfaces and buses are referred to herein as a computer system 206. Computer system 206 may include additional, fewer and/or different components.

Bus 204 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 200 may include one or more programs or applications 210, a compiler 212, an operating system 214 (e.g., such as a z/OS® or MVS™ (Multiple Virtual Storage) operating system, offered by International Business Machines Corporation, or other operating systems), and one or more computer readable program instructions 216. Computer readable program instructions 216 may be configured to carry out functions of embodiments of aspects of the invention.

Computer system 206 may also communicate via, e.g., I/O interfaces 218 with one or more external devices 230 and/or one or more network interfaces 232. Example external devices include a user terminal, data storage devices, such as a tape drive, disk or other data storage devices, a pointing device, a display, etc. In one particular example, a data storage device 234 may store one or more programs 236, one or more computer readable program instructions 238, and/or data, etc. The computer readable program instructions may be configured to carry out functions of embodiments of aspects of the invention.

Network interface 232 enables computer system 206 to communicate with one or more networks, such as a local area network (LAN), a general wide area network (WAN), and/or a public network (e.g., the Internet), providing communication with other computing devices or systems.

Computer system 206 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 206. Examples, include, but are not limited to: microcode, device drivers, redundant processing units, external disk drive arrays, RAID systems, tape drives, and data archival storage systems, etc.

Computer system 206 may be operational with numerous other general purpose or special purpose computing system environments or configurations. Examples of well-known computing systems, environments, and/or configurations that may be suitable for use with computer system 206 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Conventionally, to access data of a shared cache, such as shared cache 134 (e.g., the L3 cache or other shared cache), a request for data (e.g., a shared cache line) is received at shared cache 134 from a requesting processor, such as a processor 130. For instance, the request is received by a cache controller, such as controller 136. Controller 136 (or another component of shared cache 134) checks the state of the requested cache line, in, e.g., a shared cache directory, to determine whether the requested cache line is owned by another processor, referred to herein as the owning processor. If the requested cache line is owned by the other processor (e.g., the other processor has exclusive write access to the shared cache line), then the shared cache (e.g., controller 136) sends an intervention to the owning processor, and waits for the owning processor to process the intervention, acknowledge it and send back an indication that the cache line may be accessed by the requesting processor. This intervention, referred to as a cross-core intervention, an invalidation, or an XI intervention, is an expensive system event. For example, the access latency from, e.g., the L1 cache to the L3 cache is nominally 45 pclks, and approximately 65 pclks in a loaded system. However, for L1 to L1 cross-interventions on the same chip, the latency is approximately 90 pclks nominally and greater than 120 pclks in a loaded system. Therefore, the cross-core intervention is approximately two times more than that of a non-intervention access.

Thus, in accordance with an aspect of the present invention, a capability is provided to reduce the intervention latency, such that the intervention latency matches, e.g., the nominal non-intervention case. This capability includes, for instance, sending the cross-core intervention to the owning processor concurrent to returning the requested data to the requesting processor. The returned data is considered speculative since before committing the operations that use the data, a check is to be made as to whether the data is valid (e.g., has not been changed by the owning processor subsequent to sending the data to the requesting processor).

To further explain, based on a shared cache receiving a request for a cache line that is owned by an owning processor, a cross-core intervention is sent from the shared cache to the owning processor requesting access to the data of the cache line. Instead of the shared cache waiting for the invalidation to be processed and for a response to come back to return the data to the requesting processor, the data is sent from the shared cache to the requesting processor simultaneous with sending the cross-core intervention to the processor that owns the data. In one embodiment, along with the response coming back to the requesting processor with the requested data, an indicator is provided that indicates that the data is speculative data. The indicator indicates to the requesting processor that the requesting processor may start to work on the data, but is not to commit any operations using the data, until it obtains an indication that the data is valid.

Figure 3A:
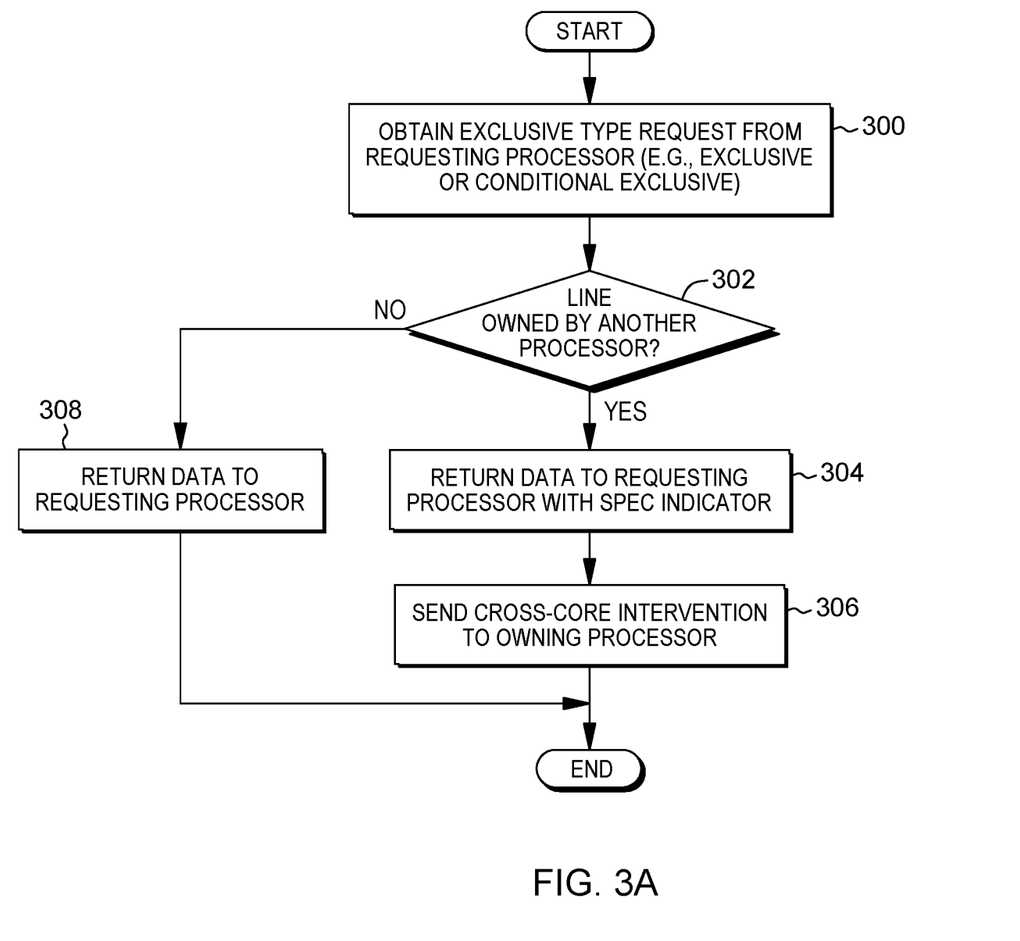
FIG. 3A depicts one example of processing associated with a request for data of a shared cache, in accordance with one or more aspects of the present invention.
Figure 3B:
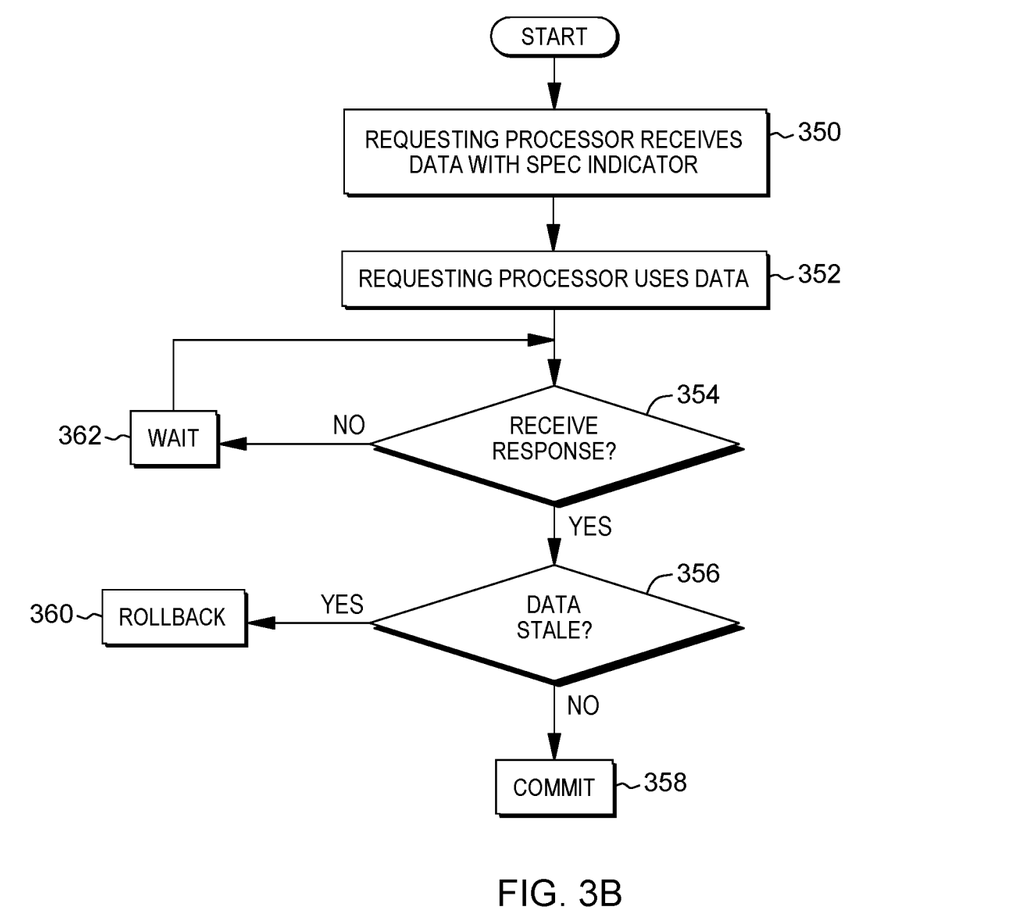
FIG. 3B depicts one example of processing associated with receiving the requested data, in accordance with one or more aspects of the present invention.

Further details regarding returning speculative data concurrent with an exclusive invalidate request are described with reference to FIGS. 3A-3B. Referring to FIG. 3A, a shared cache, such as shared cache 134 (e.g., L3 cache) obtains (e.g., receives, is provided, retrieves, etc.) an exclusive-type request (e.g., an exclusive or conditional exclusive request) from a requesting processor, STEP 300. Based on obtaining the request, a determination is made by, for instance, the shared cache (e.g., controller 136), as to whether the requested line is owned by another processor, INQUIRY 302. For instance, based on the exclusive or conditional exclusive type fetch request, the shared cache controller makes an initial directory look-up in the shared cache directory to determine whether the cache line is owned by the other processor. If the requested cache line is owned by the other processor, as indicated by state in the cache directory associated with the cache line, then the data is returned to the requesting processor with a speculative (spec) indicator (e.g., a SPEC flag) set e.g., to one, indicating that the data is provided to the requesting processor speculatively, STEP 304.

Moreover, a cross-core intervention is sent to the owning processor providing an indication that the data is being requested by the requesting processor and that the owning processor is to release ownership of the data being requested, STEP 306. In one example, the return of the speculative data and the sending of the cross-core intervention is performed in parallel or concurrently. That is, the data is returned to the requesting processor without waiting for the cross-core intervention to be processed. For instance, in one particular example, if the directory state indicates that XI intervention on a L3 hit is to be performed, data is simultaneously read out of the cache and forwarded to the requesting processor with an accompanying speculative data tag (e.g., a one bit tag), during the same pipe pass as the XI launch to the owning processor. The L3 shared cache controller monitors the L3 pipeline for stores from the XI target processor. Meanwhile, the requesting processor is able to run ahead and use the speculatively fetched data as long as it does not commit any operations.

Returning to INQUIRY 302, if the cache line is not owned by another processor, then the shared cache returns the requested data to the requesting processor, STEP 308, and this processing is complete, in one example.

Further details of processing performed by the requesting processor are described with reference to FIG. 3B. The requesting processor, based on sending the exclusive type request to the shared cache, receives the requested data with the spec indicator set, assuming the data is owned by the owning processor, STEP 350. The requesting processor uses the data in one or more operations but because the spec indicator is set, does not commit the operations without determining whether the data is valid, STEP 352. The processor determines, e.g., at the time the processor is ready to commit the data, whether it has received a response to the cross-core intervention that was sent by the cache controller based on the exclusive type request, INQUIRY 354. That is, has the requesting processor received a response, based on the shared cache sending the cross-core intervention, relating to the state of the data it received? If the response has been received, then a further determination is made as to whether the data is stale (e.g., was the cache line updated after the data was sent to the requesting processor?), INQUIRY 356. If the data is not stale (i.e., it is valid or good), then the requesting processor performs a commit of the operations, STEP 358. However, if the data is stale, INQUIRY 356, then processing of the operations is rolled back by the requesting processor and the data is not committed, STEP 360.

To further explain, at the time of the XI normal response to the shared cache controller, the shared cache controller 136 checks to see if the processor that did the invalidate (e.g., the owning processor) sent any stores to the requested cache line. If not, the response sent to the requesting processor is a data is valid confirmation with no additional data. However, if stores were sent to the requested cache line after the data was provided to the requesting processor, then the shared cache controller re-accesses the shared cache and sends the new, now correct, data to the requesting processor as the response. If the requesting processor receives the data is valid response, it is free to commit the operations. If, instead, it receives a second response with data, it drops the operations (e.g., the transactions) performed with the speculative data, and re-performs the operations with the valid data.

Returning to INQUIRY 354, if a response to the cross-core intervention has not been received by the requesting processor, then the requesting processor waits to commit the data, STEP 362.

In one or more aspects, a speculative data return to one processor (e.g., a requesting processor) is performed simultaneously with an exclusive invalidate to another processor (e.g., an owning processor) for the same cache line. As used herein, simultaneously, concurrently or in parallel means that the requesting processor receives the requested data and performs operations with the data (absent committing the operations) prior to the shared cache and/or the requesting processor receiving a response to the invalidate request.

As examples, the requesting processor and owning processor may be separate processors, such as separate processors 130, and/or separate threads within a single processor, such as a single processor 130.

One or more aspects of the present invention are inextricably tied to computer technology and facilitate processing within a computer, improving performance thereof. For instance, latency is reduced and performance is improved. Further details of one embodiment of facilitating processing within a computing environment, as it relates to one or more aspects of the present invention, are described with reference to FIGS. 4A-4B.

Figure 4A:
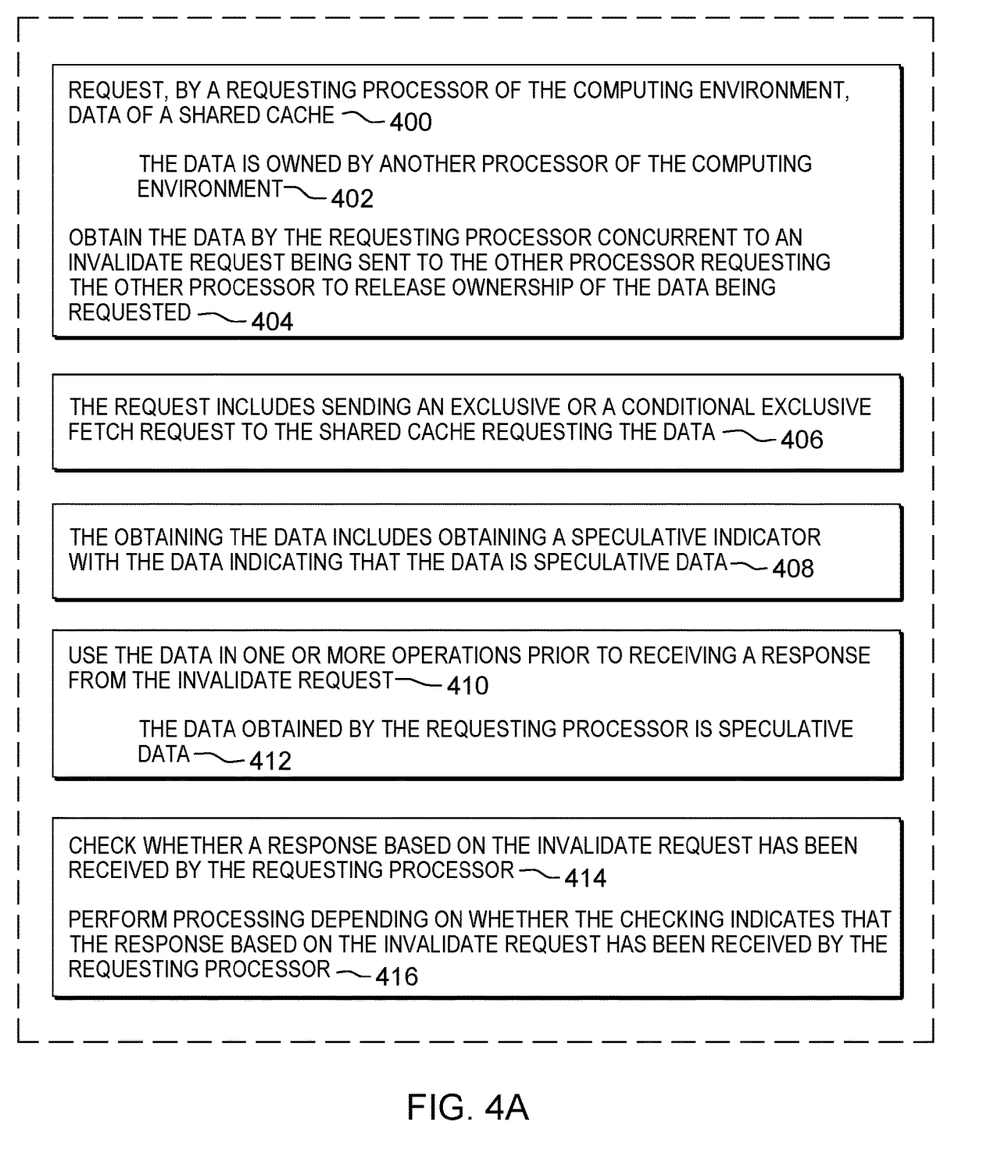
FIGS. 4A-4B depict one embodiment of one or more aspects of facilitating processing within a computing environment, in accordance with one or more aspects of the present invention.

Referring to FIG. 4A, in one aspect, a requesting processor of the computing environment requests data of a shared cache (400). The data, in one example, is owned by another processor of the computing environment (402). Based on the request, the data is obtained by the requesting processor concurrent to an invalidate request being sent to the other processor requesting the other processor to release ownership of the data being requested (404).

As an example, the request includes sending an exclusive or a conditional exclusive fetch request to the shared cache requesting the data (406). Further, in one example, the obtaining the data includes obtaining a speculative indicator with the data indicating that the data is speculative data (408).

In one embodiment, the data is used in one or more operations prior to receiving a response from the invalidate request (410). The data obtained by the requesting processor is, for instance, speculative data (412).

In one embodiment, a check is made as to whether a response based on the invalidate request has been received by the requesting processor (414). Processing is performed depending on whether the checking indicates that the response based on the invalidate request has been received by the requesting processor (416).

Figure 4B:
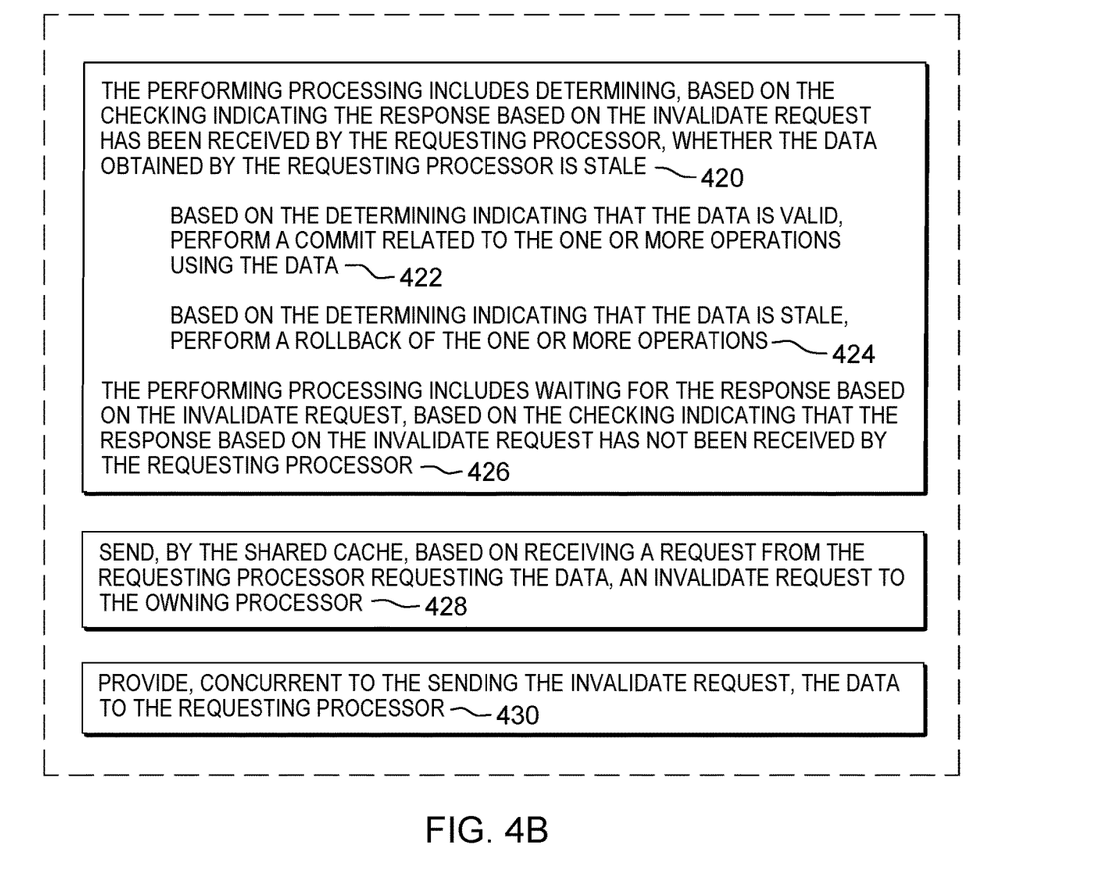

Referring to FIG. 4B, in one example, the performing processing includes determining, based on the checking indicating the response based on the invalidate request has been received by the requesting processor, whether the data obtained by the requesting processor is stale (420). As examples, based on the determining indicating that the data is valid, a commit related to the one or more operations using the data is performed (422). However, based on the determining indicating that the data is stale, a rollback of the one or more operations is performed (424).

In a further aspect, the performing processing includes waiting for the response based on the invalidate request, based on the checking indicating that the response based on the invalidate request has not been received by the requesting processor (426).

In one embodiment, based on receiving a request from the requesting processor requesting the data, an invalidate request is sent, by the shared cache, to the owning processor (428). Concurrent to sending the invalidate request, the data is provided to the requesting processor (430). Many variations are possible.

As described herein, based on an exclusive or conditional exclusive type request from a requesting processor to a shared cache, a fetch response is provided by the shared cache. A fetch response field of the fetch response contains a new additional speculative data tag (e.g., 1 bit). The speculative data tag is sent for a processor fetch command if, for instance, the following are true: Fetch exclusive (FEX) or conditional exclusive (CEX) command; no address contention encountered on cache directory look-up pipeline request; data bus from shared cache (e.g., L3) to the processor interface is available; and line hit in L3 EX2OTHER processor (exclusive to other processor) or EX2SELF (exclusive to requesting processor, but owned by another thread within the processor).

In one embodiment, if a speculative response is indicated (e.g., tag set, e.g., to 1), the local cache (e.g., L2)/processor will later receive for the same fetch either: (a) speculative data was valid (no data) final response—nominal, latency minimizing case; or (b) non-speculative response (with data) final response, implying the speculative data cannot be used and providing the correct data; or (c) speculative data was stale (no data) intermediate response followed by non-speculative response (with data) final response.

The purpose of the speculative data is valid response is to confirm the speculative data and to allow the processor to commit the operations it speculatively performed on the data. Further, the purpose of the speculative data is stale response is to prevent serialization of rollback of the processor pipeline (clear of commit queue) for the operations being performed with the speculative data. An XI reject implies the cache line in question is likely to be actively in use by multiple processors and should therefore be shared between processors as quickly as possible. Therefore, it is desirable for the processor run-ahead pipeline rollback not to delay forward progress toward obtaining this line. So, at the time of the reject, the data is invalid response is sent to allow the processor to rollback in parallel with the XI retry/ownership obtainment of the line from the XI target processor.

In one embodiment, if a speculative response is sent, the L3 coherency management protocol includes that the cache controller will watch for stores while waiting for the XI response.

If, in one embodiment, no reverse store compares have been detected at the time of the XI normal response, but active stores are in the stack, the cache controller will make a pipe pass to check for store compares. If no store compares, the cache controller will send the data is good response without data (latency scenario (a) above).

If, in one embodiment, the cache controller detects a reverse store compare during an XI wait, once the XI response is returned and the store stack compare is done, the cache controller returns a second response plus data with the updated data. This is the store occurred, cache re-read scenario (b) described above.

If, in one embodiment, an XI reject response occurs, the cache controller will send the data was stale response and will retry the XI until a normal response is received, then check for stores and return a third response plus data with the updated data (scenario (c)).

In one example, a speculative response for a CEX can either be RO (read-only) or EX (exclusive). If the data was stale response is sent, the subsequent data response can either be RO or EX. If spec_data_was_valid response is sent, it implies the response state (EX or RO) is the same as on the speculative response plus data. Note the speculative response could be RO and the final could be EX. If a CEX sends an RO speculative response and the final response is EX, new data is to be sent (Nest upgrades for RO to EX response if stores were sent by the owning processor in between the time of the speculative response to the requesting processor and the time of the XI response from the owning processor).

In one aspect, coherency is maintained, and address compares are used against the store stack (e.g., the shared cache write queue) to identify when speculatively returned data is stale. One or more aspects provide a simultaneous return of the requested data to a processor with an XI launch and eliminates re-access of the cache after the XI, if data remains unchanged. This allows the processor access to the line with the same latency as no-XI required hit states.

Although examples herein describe a miss in a private cache, such as an L1/L2 cache and obtaining the data from a shared cache (e.g., L3 cache), one or more aspects apply to misses in other caches or memory, such as in the shared cache, in which the data is retrieved from another shared cache. Other examples are possible, including, but not limited to, retrieving data across chips and/or across drawers, etc. Many variations are possible.

Aspects of the present invention may be used by many types of computing environments. Another embodiment of a computing environment to incorporate and use one or more aspects of the present invention is described with reference to FIG. 5A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include a PowerPC® processor offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel Corporation, Oracle, or others. IBM, z/Architecture, z/OS, PR/SM and PowerPC are trademarks or registered trademarks of International Business Machines Corporation in at least one jurisdiction. Intel and Itanium are trademarks or registered trademarks of Intel Corporation or its subsidiaries in the United States and other countries.

Figure 5A:
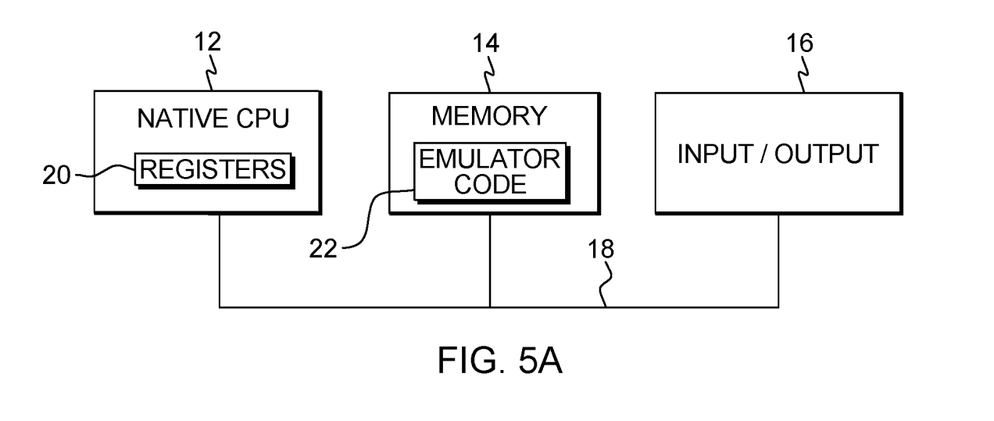
FIG. 5A depicts another example of a computing environment to incorporate and use one or more aspects of the present invention.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 5B:
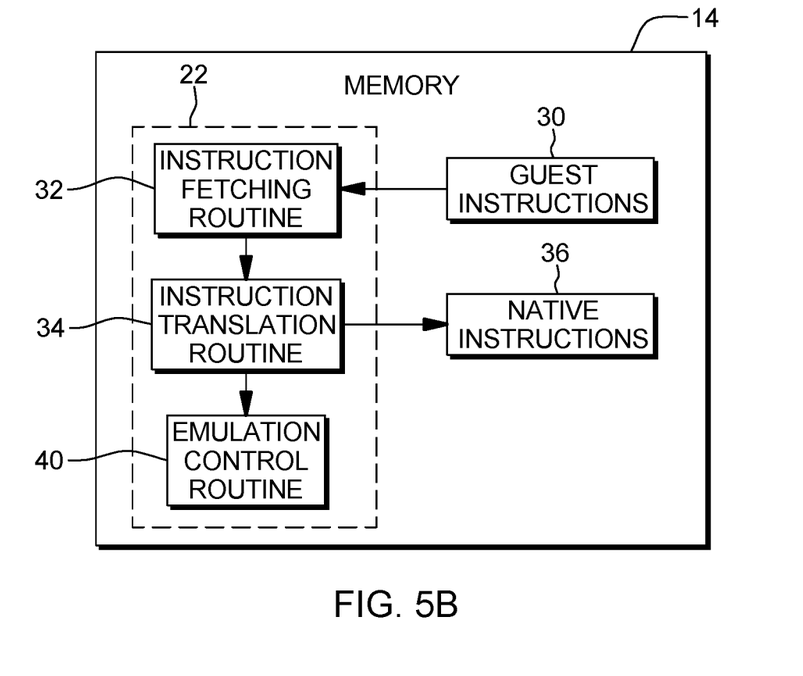
FIG. 5B depicts further details of the memory of FIG. 5A.

Further details relating to emulator code 22 are described with reference to FIG. 5B. Guest instructions 30 stored in memory 14 comprise software instructions (e.g., correlating to machine instructions) that were developed to be executed in an architecture other than that of native CPU 12. For example, guest instructions 30 may have been designed to execute on a processor based on the z/Architecture hardware architecture, but instead, are being emulated on native CPU 12, which may be, for example, an Intel Itanium II processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

The computing environments described above are only examples of computing environments that can be used. Other environments, including but not limited to, non-partitioned environments, partitioned environments, and/or emulated environments, may be used; embodiments are not limited to any one environment.

Each computing environment is capable of being configured to include one or more aspects of the present invention. For instance, each may be configured to provide the return of data simultaneous to sending an and invalidate request, in accordance with one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
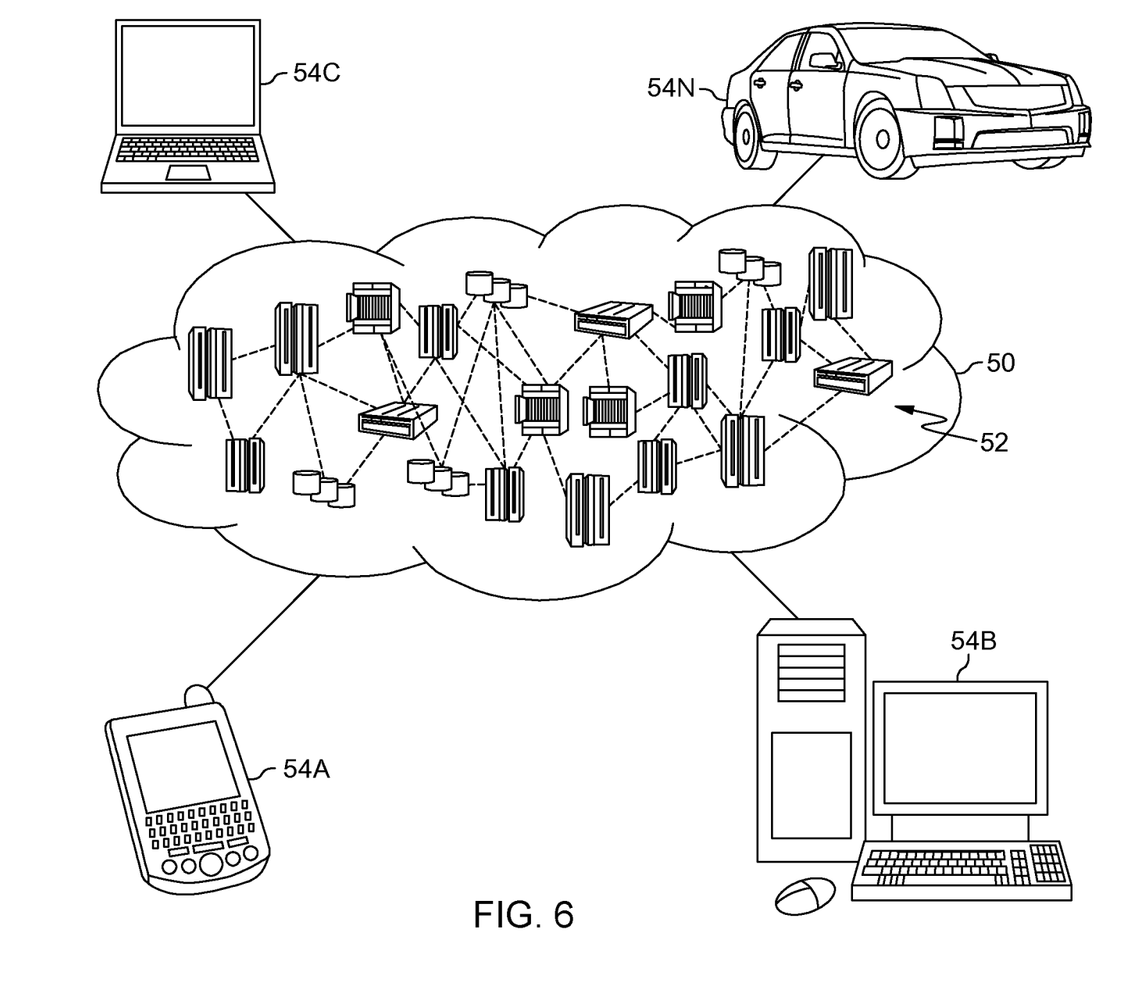
FIG. 6 depicts one embodiment of a cloud computing environment.

Referring now to FIG. 6, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 52 and cloud computing environment 50 can communicate with any type of computerized device over any type of network and/or network addressable connection (e.g., using a web browser).

Figure 7:
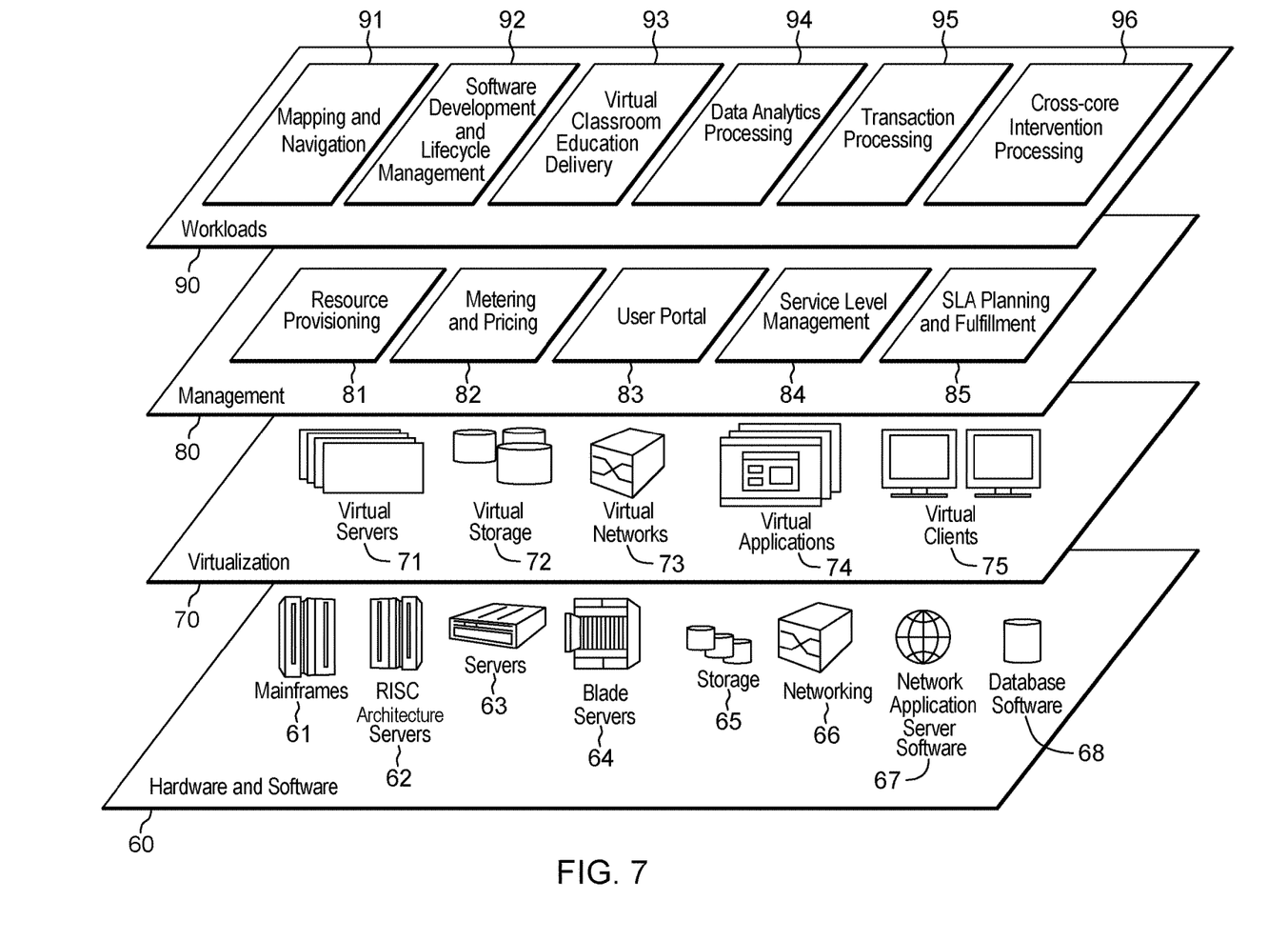
FIG. 7 depicts one example of abstraction model layers.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cross-core intervention processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different cache levels may benefit from one or more aspects of the present invention. Other types of invalidations or other requests may be used, as well as other types of processors. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   at least one computer readable storage medium readable by at least one processing circuit and storing instructions for performing a method comprising:
      requesting, by a requesting processor of the computing environment, data of a shared cache, the data being owned by another processor of the computing environment; and
      obtaining the data by the requesting processor concurrent to an invalidate request being sent to the other processor requesting the other processor to release ownership of the data being requested, wherein the data is obtained by the requesting processor prior to there being a response from the invalidate request.

2. The computer program product of claim 1, wherein the obtaining the data includes obtaining a speculative indicator with the data indicating that the data is speculative data.

3. The computer program product of claim 1, wherein the method further comprises using the data in one or more operations prior to receiving the response from the invalidate request.

4. The computer program product of claim 3, wherein the method further comprises:
   checking whether a response based on the invalidate request has been received by the requesting processor; and
   performing processing depending on whether the checking indicates that the response based on the invalidate request has been received by the requesting processor.

5. The computer program product of claim 4, wherein the performing processing comprises:
   determining, based on the checking indicating the response based on the invalidate request has been received by the requesting processor, whether the data obtained by the requesting processor is stale; and
   performing, based on the determining indicating that the data is valid, a commit related to the one or more operations using the data.

6. The computer program product of claim 4, wherein the performing processing comprises:
   determining, based on the checking indicating the response based on the invalidate request has been received by the requesting processor, whether the data obtained by the requesting processor is stale; and performing a rollback of the one or more operations, based on the determining indicating that the data is stale.

7. The computer program product of claim 4, wherein the performing processing comprises waiting for the response based on the invalidate request, based on the checking indicating that the response based on the invalidate request has not been received by the requesting processor.

8. The computer program product of claim 1, wherein the data obtained by the requesting processor is speculative data.

9. The computer program product of claim 1, wherein the requesting comprises sending an exclusive or a conditional exclusive fetch request to the shared cache requesting the data.

10. The computer program product of claim 1, wherein the method further comprises:
sending, by the shared cache, based on receiving a request from the requesting processor requesting the data, an invalidate request to the owning processor; and
providing, concurrent to the sending the invalidate request, the data to the requesting processor.

11. A computer system for facilitating processing within a computing environment, the computer system comprising:
a memory; and
a processor in communication with the memory, wherein the computer system is configured to perform a method, said method comprising:
requesting, by a requesting processor of the computing environment, data of a shared cache, the data being owned by another processor of the computing environment; and
obtaining the data by the requesting processor concurrent to an invalidate request being sent to the other processor requesting the other processor to release ownership of the data being requested, wherein the data is obtained by the requesting processor prior to there being a response from the invalidate request.

12. The computer system of claim 11, wherein the obtaining the data includes obtaining a speculative indicator with the data indicating that the data is speculative data.

13. The computer system of claim 11, wherein the method further comprises using the data in one or more operations prior to receiving the response from the invalidate request.

14. The computer system of claim 13, wherein the method further comprises:
checking whether a response based on the invalidate request has been received by the requesting processor; and
performing processing depending on whether the checking indicates that the response based on the invalidate request has been received by the requesting processor.

15. The computer system of claim 14, wherein the performing processing comprises:
determining, based on the checking indicating the response based on the invalidate request has been received by the requesting processor, whether the data obtained by the requesting processor is stale; and
performing, based on the determining indicating that the data is valid, a commit related to the one or more operations using the data.

16. The computer system of claim 14, wherein the performing processing comprises:
determining, based on the checking indicating the response based on the invalidate request has been received by the requesting processor, whether the data obtained by the requesting processor is stale; and
performing a rollback of the one or more operations, based on the determining indicating that the data is stale.

17. A computer-implemented method of facilitating processing within a computing environment, the computer-implemented method comprising:
requesting, by a requesting processor of the computing environment, data of a shared cache, the data being owned by another processor of the computing environment; and
obtaining the data by the requesting processor concurrent to an invalidate request being sent to the other processor requesting the other processor to release ownership of the data being requested, wherein the data is obtained by the requesting processor prior to there being a response from the invalidate request.

18. The computer-implemented method of claim 17, wherein the obtaining the data includes obtaining a speculative indicator with the data indicating that the data is speculative data.

19. The computer-implemented method of claim 17, further comprising using the data in one or more operations prior to receiving the response from the invalidate request.

20. The computer-implemented method of claim 19, further comprising:
checking whether a response based on the invalidate request has been received by the requesting processor; and
performing processing depending on whether the checking indicates that the response based on the invalidate request has been received by the requesting processor.

* * * * *